US012485354B2

(12) United States Patent
Rao

(10) Patent No.: US 12,485,354 B2
(45) Date of Patent: Dec. 2, 2025

(54) GAMING LIVE STREAM CONTROL METHOD AND DEVICE, COMPUTER STORAGE MEDIUM, AND ELECTRONIC APPARATUS

(71) Applicant: NETEASE (HANGZHOU) NETWORK CO., LTD., Zhejiang (CN)

(72) Inventor: Feng Rao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 283 days.

(21) Appl. No.: 17/808,112

(22) Filed: Jun. 22, 2022

(65) Prior Publication Data

US 2022/0314129 A1 Oct. 6, 2022

Related U.S. Application Data

(63) Continuation of application No. PCT/CN2020/102193, filed on Jul. 15, 2020.

(30) Foreign Application Priority Data

Dec. 31, 2019 (CN) ........................ 201911422199.6

(51) Int. Cl.
*A63F 13/86* (2014.01)
*A63F 13/52* (2014.01)

(52) U.S. Cl.
CPC .............. *A63F 13/86* (2014.09); *A63F 13/52* (2014.09); *A63F 2300/577* (2013.01)

(58) Field of Classification Search
CPC ..... A63F 13/86; A63F 13/52; A63F 2300/577
See application file for complete search history.

(56) References Cited

U.S. PATENT DOCUMENTS

2007/0117617 A1* 5/2007 Spanton .................. A63F 13/12 463/40
2014/0113718 A1* 4/2014 Norman ................ A63F 13/822 463/31

(Continued)

FOREIGN PATENT DOCUMENTS

CN 106502491 A 3/2017
CN 106569667 A 4/2017

(Continued)

OTHER PUBLICATIONS

International Search Report dated Sep. 27, 2020 of PCT International Application No. PCT/CN2020/102193.

(Continued)

*Primary Examiner* — Werner G Garner
(74) *Attorney, Agent, or Firm* — Qinghong Xu

(57) ABSTRACT

The present disclosure relates to the technical field of gaming, and provides a gaming live stream control method and device, a computer storage medium, and an electronic apparatus. The gaming live stream control method is applicable to a live stream server or a cloud gaming server, and comprises: acquiring a gaming frame corresponding to a live stream room; receiving a show-controls request sent by a live stream audience member, wherein the show-controls request is used to instruct the live stream server or the cloud gaming server to specify controls information comprised in a gaming live stream frame to be transmitted to the live stream audience member; determining, according to the show-controls request, controls information to be shown, and generating the gaming live stream frame according to the gaming frame and the controls information; and transmitting the gaming live stream frame to the live stream audience member.

20 Claims, 14 Drawing Sheets

(56) References Cited

U.S. PATENT DOCUMENTS

| | | | |
|---|---|---|---|
| 2015/0131969 A1 | 5/2015 | Taraki et al. | |
| 2021/0052988 A1* | 2/2021 | Fear | A63F 13/795 |

FOREIGN PATENT DOCUMENTS

| | | |
|---|---|---|
| CN | 107015746 A | 8/2017 |
| CN | 109151489 A | 1/2019 |
| CN | 109275040 A | 1/2019 |
| CN | 109429091 A | 3/2019 |
| CN | 111131851 A | 5/2020 |

OTHER PUBLICATIONS

The First Office Action dated Aug. 24, 2020 of Chinese Patent No. 201911422199.6.

* cited by examiner

GAMING LIVE STREAM CONTROL METHOD AND DEVICE, COMPUTER STORAGE MEDIUM, AND ELECTRONIC APPARATUS

CROSS-REFERENCE TO RELATED APPLICATION

This application is a continuation application of PCT Application No. PCT/CN2020/102193, entitled "GAMING LIVE STREAM CONTROL METHOD AND DEVICE, COMPUTER STORAGE MEDIUM, AND ELECTRONIC APPARATUS" filed on Jul. 15, 2020, which claims the priority to the Chinese Patent Application NO. 201911422199.6, entitled "GAMING LIVE STREAM CONTROL METHOD AND DEVICE, COMPUTER STORAGE MEDIUM, AND ELECTRONIC APPARATUS", filed on Dec. 31, 2019, the entire contents of which are hereby incorporated by reference.

TECHNICAL FIELD

Embodiments of the present disclosure relate to the field of game technologies, and in particular to a method for controlling live game streaming, a device for controlling live game streaming, a computer-readable storage medium, and an electronic device.

BACKGROUND

With the development of live streaming technologies, many people watch a streamer play games through live streaming. In the current live streaming technologies, video information of a game application at a streamer side can be obtained, and then the video information can be sent to a viewer side to obtain live video. However, when a viewer is watching the live video, screens the viewer watches usually include game interfaces and operation control screens of the game application at the streamer side, and it is impossible for the viewer to independently choose to watch only the game interfaces or request customized operation controls.

In view of this, there is an urgent need to develop a new method and device for controlling live game streaming in this field.

It should be noted that the information disclosed in the background section above is only used to enhance the understanding of the background of the present disclosure, and therefore may include information that does not constitute the prior art known to those skilled in the art.

SUMMARY

An objective of the present disclosure is to provide a method for controlling live game streaming, a device for controlling live game streaming, a computer-readable storage medium, and an electronic device, thereby improving user's experience.

Other characteristics and advantages of the present disclosure will become apparent through the following detailed description, or can be partly learned through the practice of the present disclosure.

According to an aspect of the present disclosure, there is provided a method for controlling live game streaming, which is implemented at a live streaming server or a cloud gaming server, including: obtaining a game interface corresponding to a live streaming room; receiving a presentation request sent by a viewer, wherein the presentation request is used for indicating the live streaming server or the cloud gaming server to specify control information contained in a live game interface transmitted to the viewer; determining control information to be presented according to the presentation request, and generating the live game interface according to the game interface and the control information to be presented; and transmitting the live game interface to the viewer.

In an exemplary embodiment of the present disclosure, the obtaining the game interface corresponding to the live streaming room includes: receiving an access request for the live streaming room sent by the viewer, wherein the access request includes live streaming room information; and obtaining the game interface according to the live streaming room information.

In an exemplary embodiment of the present disclosure, the determining the control information to be presented according to the presentation request includes: receiving a target option sent by the viewer, and selecting control information corresponding to the target option as the control information to be presented.

In an exemplary embodiment of the present disclosure, the generating the live game interface according to the game interface and the control information to be presented includes: generating the live game interface by rendering the game interface according to the control information to be presented.

In an exemplary embodiment of the present disclosure, upon transmitting the live game interface to the viewer, an access authority for the live streaming room is assigned to the viewer.

In an exemplary embodiment of the present disclosure, the transmitting the live game interface to the viewer includes: transmitting the live game interface to the viewer in a form of an encoded video stream.

In an exemplary embodiment of the present disclosure, the method further includes: determining an initial live game interface according to an identification of a viewer client and the game interface, and transmitting the initial live game interface to the viewer.

In an exemplary embodiment of the present disclosure, the determining the initial live game interface according to the identification of the viewer client and the game interface includes: obtaining preset control information corresponding to the identification of the viewer client; and generating the initial live game interface by performing rendering according to the preset control information and the game interface.

In an exemplary embodiment of the present disclosure, the preset control information is default interface information or control information selected by the viewer when logging in to the viewer client last time.

In an exemplary embodiment of the present disclosure, after the transmitting the live game interface to the viewer, the method further includes: receiving an update request sent by the viewer, and sending a plurality of options to the viewer according to the update request; receiving a target option sent by the viewer, and obtaining an updated live game interface by performing rendering according to target control information corresponding to the target option and the game interface; and replacing the live game interface with the updated live game interface.

In an exemplary embodiment of the present disclosure, before the obtaining the game interface corresponding to the live streaming room, the method further includes: receiving a creation request for the live streaming room sent by a streamer, calling a preset interface, and creating the live streaming room according to the creation request; obtaining a game instruction sent by the streamer in real time, and obtaining the live game interface by performing logical calculation according to the game instruction; and obtaining a streamer live game interface performing rendering according to streamer initial interface information and the live game interface, and transmitting the streamer live game interface to the streamer.

In an exemplary embodiment of the present disclosure, the obtaining the game interface corresponding to the live streaming room includes: determining a streamer client corresponding to the live streaming room according to the live streaming room; and obtaining a game interface in the streamer client, and using a live game interface on the streamer client as the game interface.

According to an aspect of the present disclosure, there is provided a device for controlling live game streaming, which is implemented at a live streaming server or a cloud gaming server, and includes: a screen obtaining module, configured to obtain a game interface corresponding to a live streaming room; a request receiving module, configured to receive a presentation request sent by a viewer, wherein the presentation request is used for indicating the live streaming server or the cloud gaming server to specify control information contained in a live game interface transmitted to the viewer; a screen generating module, configured to determine control information to be presented according to the presentation request, and generate the live game interface according to the game interface and the control information to be presented; and a screen transmitting module, configured to transmit the live game interface to the viewer.

According to an aspect of the present disclosure, there is provided a computer-readable medium having a computer program stored thereon, and the computer program, when executed by a processor, implements the method for controlling live game streaming described in the foregoing embodiments.

According to an aspect of the present disclosure, there is provided an electronic device, including: one or more processors; and a storage device for storing one or more programs which, when executed by the one or more processors, cause the one or more processors to implement the method for controlling live game streaming described in the foregoing embodiments.

It should be understood that the above general description and the following detailed description are merely exemplary and explanatory, and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain the principles of the present disclosure. It should be noted that, the drawings in the following description are only some embodiments of the present disclosure. For those of ordinary skill in the art, other drawings may be obtained based on these drawings without departing from the spirit of the present disclosure.

DETAILED DESCRIPTION

Figure 1:
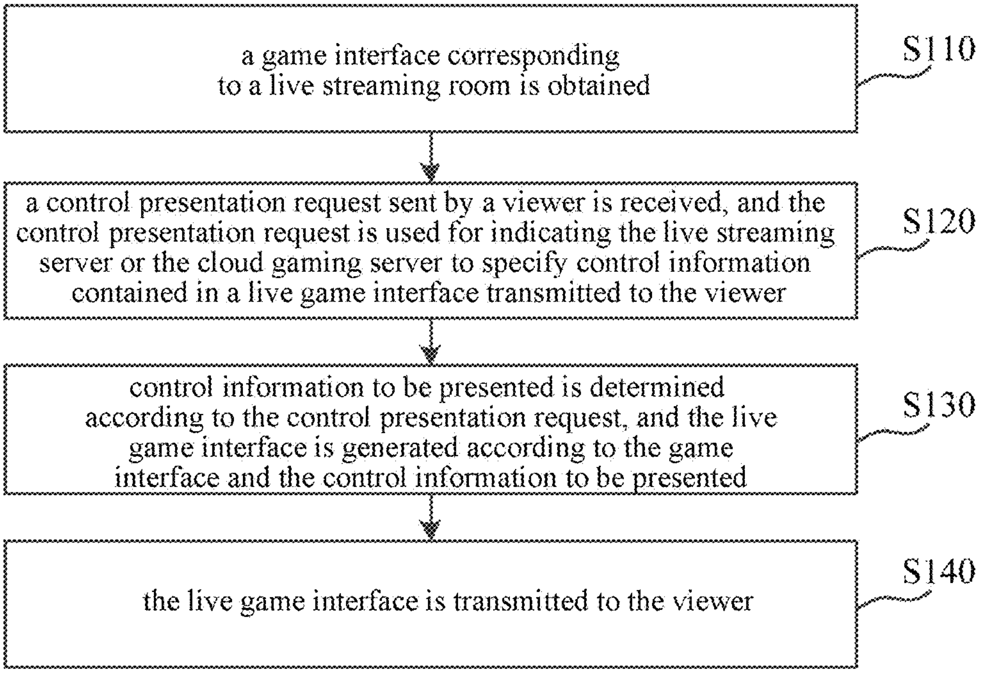
FIG. 1 schematically shows a schematic flowchart of a method for controlling live game streaming according to an embodiment of the present disclosure.

Example embodiments will now be described more fully with reference to the accompanying drawings. However, the embodiments may be implemented in a variety of forms and should not be construed as being limited to the examples set forth herein; rather, these embodiments are provided so that the present disclosure will be more complete so as to convey the spirit of the exemplary embodiments to those skilled in this art.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, devices, materials, steps and the like may be employed. In other instances, well-known methods, devices, implementations or operations are not shown or described in detail to avoid obscuring various aspects of the present disclosure.

Some of the block diagrams shown in the figures are only functional entities and do not necessarily correspond to physically or logically separate entities. These functional entities may be implemented in software, or implemented in one or more hardware modules or integrated circuits, or implemented in different networks and/or processor devices and/or microcontroller devices.

A flowchart shown in the drawings is only an exemplary illustration, and does not necessarily include all content and operations/steps, nor does it have to be executed in the described order. For example, some operations/steps may be decomposed, and some operations/steps may be combined or partially combined, so an actual execution order may be changed according to actual conditions.

In the existing live game streaming technologies, a game video collected from a streamer side can be pushed to a live streaming server in a form of a video stream, and then the video stream can be pulled to the local by a viewer side to realize the live video streaming. When a viewer is watching a live game, there is no need for the viewer side to display a graphical user interface of the streamer side, and an immersive game-viewing experience without the graphical user interface or other graphical user interface information may even be needed. However, during the live game streaming, it is not yet possible for the viewer side to control the graphical user interface on its own.

Based on the problems existing in the related art, a method for controlling live game streaming is provided by an embodiment of the present disclosure. FIG. 1 shows a schematic flowchart of a method for controlling live game streaming. As shown in FIG. 1, the method for controlling live game streaming at least includes the following steps S110 to S140.

In step S110, a game interface corresponding to a live streaming room is obtained.

In step S120, a presentation request sent by a viewer is received, and the presentation request is used for indicating the live streaming server or the cloud gaming server to specify control information contained in a live game interface transmitted to the viewer.

In step S130, control information to be presented is determined according to the presentation request, and the live game interface is generated according to the game interface and the control information to be presented.

In step S140, the live game interface is transmitted to the viewer.

In the method for controlling live game streaming according to the embodiments of the present disclosure, on the one hand, by responding to the presentation request of the viewer, a self-defined setting of the live game interface by the viewer is realized, which meets various user needs and improves the user experience; on the other hand, when the viewer dynamically sets the live game interface, it does not affect the live game interface of the streamer or other viewers, thereby saving system resources.

It should be noted that the method for controlling live game streaming provided by the embodiments of the present disclosure can be applied to, implemented at or performed by a streaming server. The streaming server can be, for example, a live streaming server or a cloud gaming server.

The live streaming server can be a server in a live streaming system which can also include a live streamer (i.e., an anchor) client that hosts a live streaming and one or more viewer clients that watch the live streaming of the streamer. The live streamer client can send a live streaming interface of the live streaming to the live streaming server, which can send, or process and send the live streaming interface to the viewer clients.

The cloud gaming server can be a server in a cloud gaming system which can also include one or more cloud gaming clients. The cloud gaming server can run a game app, render a game interface of the game, and send the rendered game interface to the cloud gaming client.

The clients as described above can be in a form of an App, a web browser, or the like.

Figure 2:
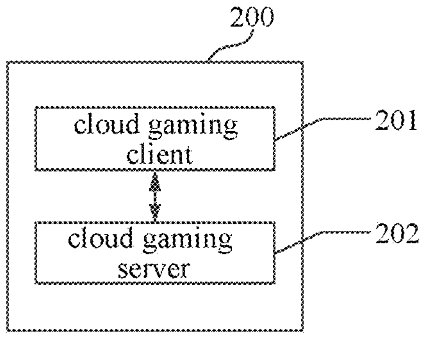
FIG. 2 schematically shows a schematic structural diagram of a cloud gaming platform using the present technical solution according to an embodiment of the present disclosure.
Figure 3:
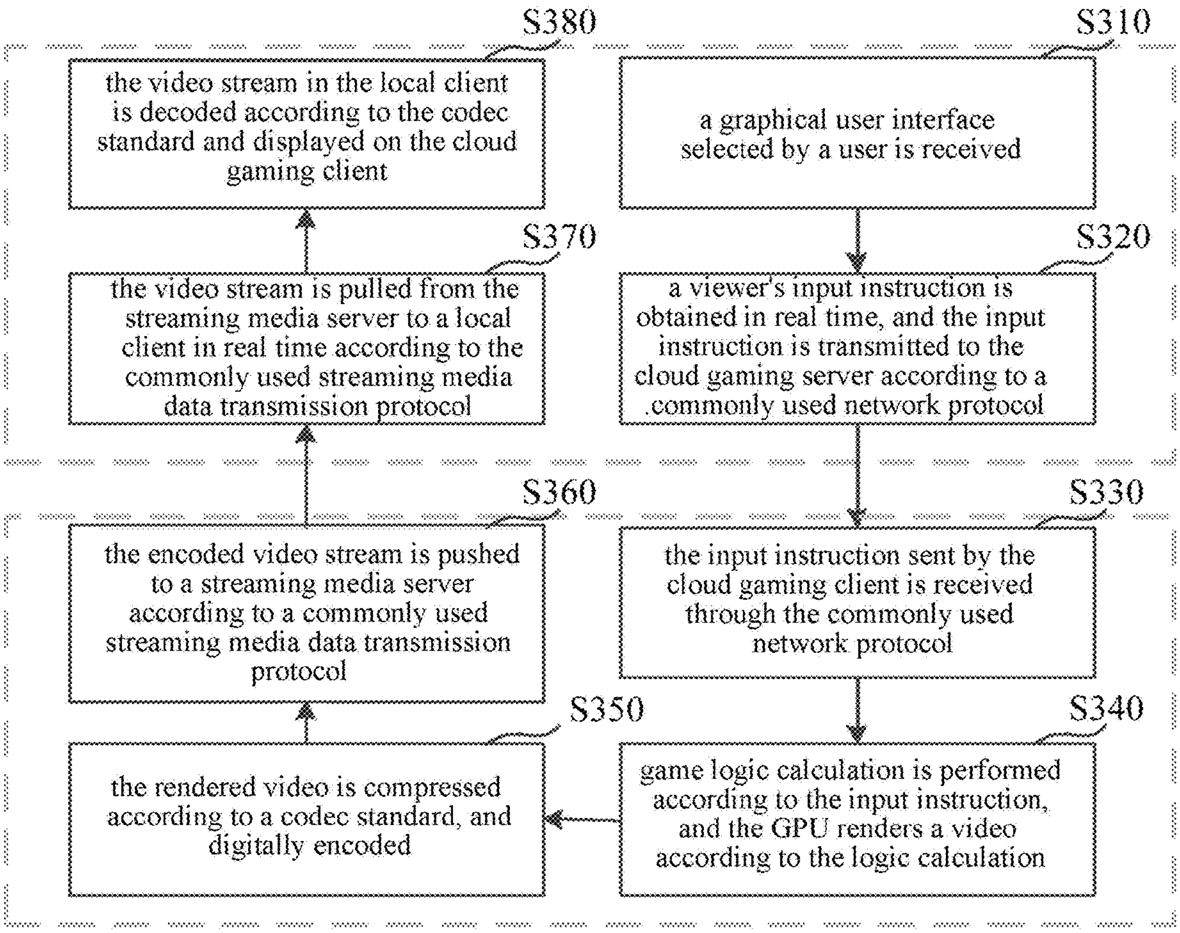
FIG. 3 schematically shows a schematic flowchart of using a cloud gaming platform according to an embodiment of the present disclosure.

For example, FIG. 2 schematically shows a schematic structural diagram of a cloud gaming platform using technical solutions of the embodiments of the present disclosure. As shown in FIG. 2, the cloud gaming platform 200 may include a cloud gaming client 201 and a cloud gaming server 202. Specifically, FIG. 3 schematically shows a schematic flowchart of a live game streaming by using the cloud gaming platform 200. As shown in FIG. 3, taking a viewer client as an example, in step S310, a graphical user interface selected by a user is received; in step S320, a viewer's input instruction is obtained in real time, and the input instruction is transmitted to the cloud gaming server 202 according to a commonly used network protocol; the input instruction includes user's trigger start time, position coordinates, trigger end time, and trigger control information, etc.; in step S330, the input instruction sent by the cloud gaming client 201 is received through the commonly used network protocol; in step S340, game logic calculation is performed according to the input instruction, and the GPU renders a video according to the logic calculation; in step S350, the rendered video is compressed according to a codec standard, and digitally encoded; in step S360, the encoded video stream is pushed to a streaming media server according to a commonly used streaming media data transmission protocol; in step S370, the video stream is pulled from the streaming media server to a local client in real time according to the commonly used streaming media data transmission protocol; and in step S380, the video stream in the local client is decoded according to the codec standard and displayed on the cloud gaming client 201. The step S310, the step S320, the step S370, and the step S380 is performed by the cloud gaming client 201, and the step S330, the step S340, the step S350, and the step S360 is performed by the cloud gaming server 202.

In addition, the method for controlling live game streaming is generally executed by a processor with a computing function, and the processor may include a terminal device, may also include a server, or a processor having the computing function and formed by a combination of the terminal device and the server, which is limited by the present disclosure.

In order to illustrate the technical solution of the present disclosure clearer, a detailed description of the method for controlling live game streaming in the exemplary embodiment will be given below with an example.

In the step S110, the game interface corresponding to the live streaming room is obtained.

In an exemplary embodiment of the present disclosure, an access request for a live streaming room sent by the viewer is received, and the access request includes live streaming room information where the viewer is located; and the game interface corresponding to the live streaming room is obtained according to the live streaming room information.

In an exemplary embodiment of the present disclosure, a streamer client corresponding to the live streaming room is determined according to the live streaming room; and a game interface in the streamer client is obtained and a live game interface on the streamer client is used as the game interface.

Figure 4:
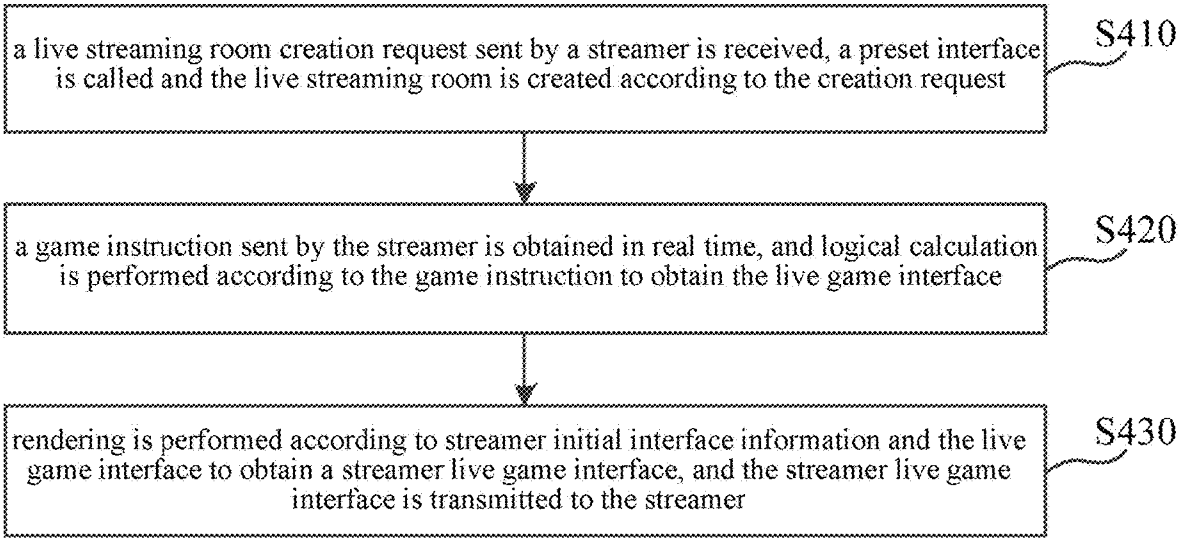
FIG. 4 schematically shows a schematic flowchart of a method for controlling live game streaming in a streamer client according to an embodiment of the present disclosure.

In an exemplary embodiment of the present disclosure, before the obtaining the game interface corresponding to the live streaming room, the live game interface in the streamer client is set. FIG. 4 schematically shows a schematic flowchart of a method for controlling live game streaming in a streamer client, and as shown in FIG. 4, it includes the following steps.

In step S410, a live streaming room creation request sent by a streamer is received, a preset interface is called and the live streaming room is created according to the creation request.

In an exemplary embodiment of the present disclosure, the live streaming room creation request includes streamer identification information and creation time, and the preset interface includes a live streaming data interface.

In an exemplary embodiment of the present disclosure, on the cloud gaming platform 200, the live streaming data interface is provided on a game interface, an operation of the streamer to trigger the live streaming data interface is received, and the live streaming room is created according to the operation of triggering the live streaming data interface, and live streaming room information corresponding to the live streaming room is sent to the streamer client.

In step S420, a game instruction sent by the streamer is obtained in real time, and logical calculation is performed according to the game instruction to obtain the live game interface.

In an exemplary embodiment of the present disclosure, the game instruction of the streamer are obtained in real time, and the game logic is calculated and rendering is performed according to the streamer identification and the game instruction, so as to obtain the live game interface.

In step S430, rendering is performed according to streamer initial interface information and the live game interface to obtain streamer live game interface, and the streamer live game interface is transmitted to the streamer.

In an exemplary embodiment of the present disclosure, the streamer initial interface information is preset on the streamer client, and the streamer initial interface information may be default settings of the streamer client or self-defined settings by the streamer, which is not specifically limited by the present disclosure. The streamer initial interface information may include various interface information such as a player interface, a viewing interface, an immersive interface and the like.

In an exemplary embodiment of the present disclosure, the streamer live game interface is encoded, and the encoded streamer live game interface is transmitted to the streamer client in the form of a video stream.

In the step S120, the presentation request sent by the viewer is received, and the presentation request is used for indicating the live streaming server or the cloud gaming server 202 to specify the control information contained in the live game interface transmitted to the viewer.

In an exemplary embodiment of the present disclosure, the presentation request may be a request formed by the viewer triggering a control presentation button in the live streaming room, or a request formed by the viewer triggering control information on a live streaming room interface, which is not specifically limited by the present disclosure.

The control information can be contained in a live game interface transmitted by the live streaming server or cloud gaming server 202 to the viewer client, and the live game interface is a live game interface of a streamer client corresponding to the live streaming room. Therefore, the control information in this embodiment may include a game operation control (or, control widget) on the live game interface of the streamer client. The game operation control may include a skill control, direction control, voice control, map display control, virtual resource display control, etc. The game operation controls may include different types and numbers of controls according to different game types, which are not specifically limited in the present disclosure. In addition, if the live streaming room is playing a live game competition, the game operation control may also be a score display control, a player information display control, a perspective selection control, and so on.

In the step S130, the control information to be presented is determined according to the presentation request, and the live game interface is generated according to the game interface and the control information to be presented.

Figure 5:
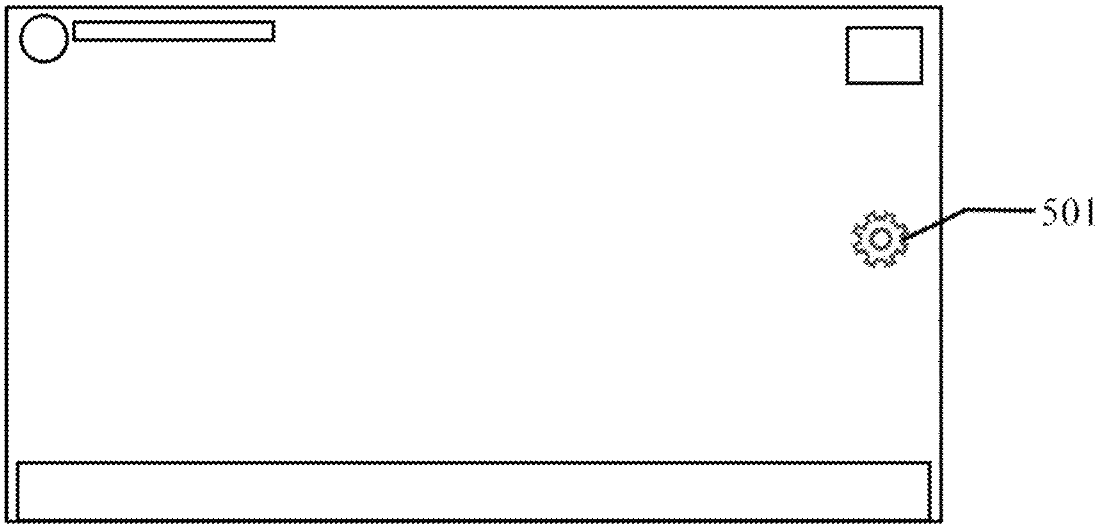
FIG. 5 schematically shows a schematic diagram of an interface for displaying a control presentation button in a live streaming room according to an embodiment of the present disclosure.

In an exemplary embodiment of the present disclosure, the presentation request may be formed by the viewer triggering the control presentation button in the live streaming room. For example, FIG. 5 schematically shows a schematic diagram of an interface displaying a control presentation button in a live streaming room. As shown in FIG. 5, a control presentation button 501 is displayed on the live streaming room interface, and the viewer may click the control presentation button 501 to select the control information to be presented.

Figure 6:
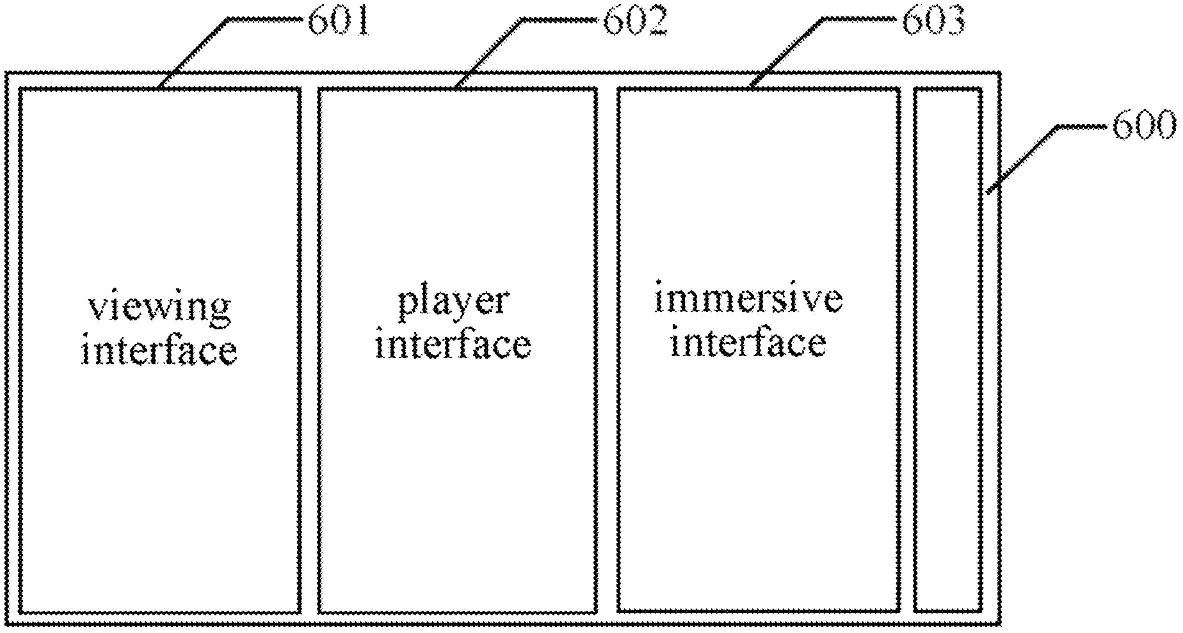
FIG. 6 schematically shows a schematic diagram of a option interface according to an embodiment of the present disclosure.

In an exemplary embodiment of the present disclosure, a target option sent by the viewer is received, and control information corresponding to the target option is used as the control information to be presented. Specifically, a plurality of options may be sent to the viewer according to the presentation request, so that the viewer may determine the target option according to the plurality of options. For example, FIG. 6 schematically shows a schematic diagram of a option interface. As shown in FIG. 6, the option interface 600 includes three options to be selected, including a viewing option 601 (which may be a designated option for viewing control), a player option 602 (which may be an option for presenting an streamer side application), and an immersive option 603 (which may be an option without control information). The viewer may determine the target option by triggering one of the viewing option 601, the player option 602 and the immersive option 603. The present disclosure does not specifically limit the number and form of the options to be selected. These changes should be understood as belonging to the protection scope of the present disclosure. Alternatively, the viewer may customize the target option by way of dialog box input, that is to say, the viewers can customize the size, position, number and transparency of the control in the live game interface. which is not specifically limited in the present disclosure.

Figure 7:
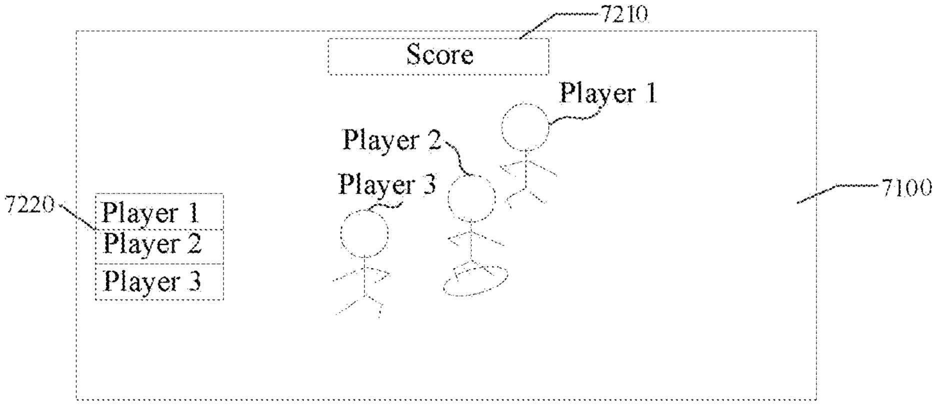
FIG. 7 schematically shows a schematic diagram of a live game interface of a viewer client according to an embodiment of the present disclosure.

FIG. 7 schematically shows a schematic diagram of a live game interface of a viewer client according to an embodiment of the present disclosure. As shown in FIG. 7, on the viewer client, a live game interface can be displayed after the viewing option is clicked by the viewer. The live game interface includes a game interface 7100 and game operation controls on the live game interface of the streamer client. The game operation controls include a score control 7210, a player information display control 7220, and the like.

Figure 8:
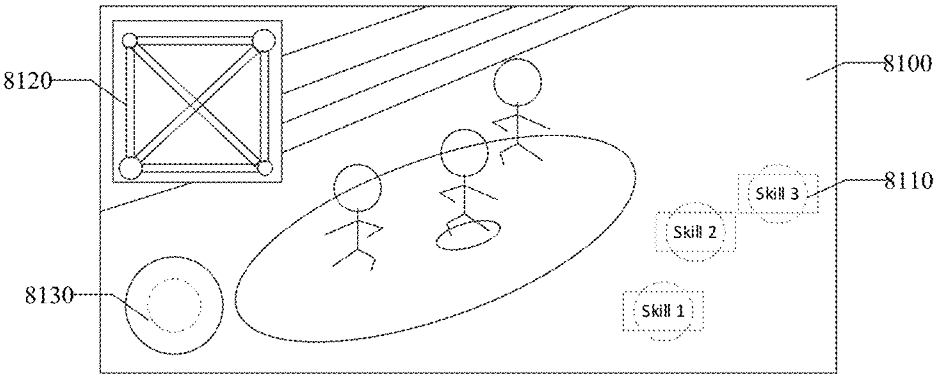
FIG. 8 schematically shows a schematic diagram of a live game interface of a viewer client according to an embodiment of the present disclosure.

FIG. 8 schematically shows a schematic diagram of a live game interface of a viewer client according to an embodiment of the present disclosure. As shown in FIG. 8, on a viewer client, a live game interface can be displayed after the player option is clicked by the viewer. The live game interface includes a game interface 8100 and game operation controls on the live game interface of the streamer client. The game operation controls include a skill control 8110, a map display control 8120, a direction control 8130, and the like.

Figure 9:
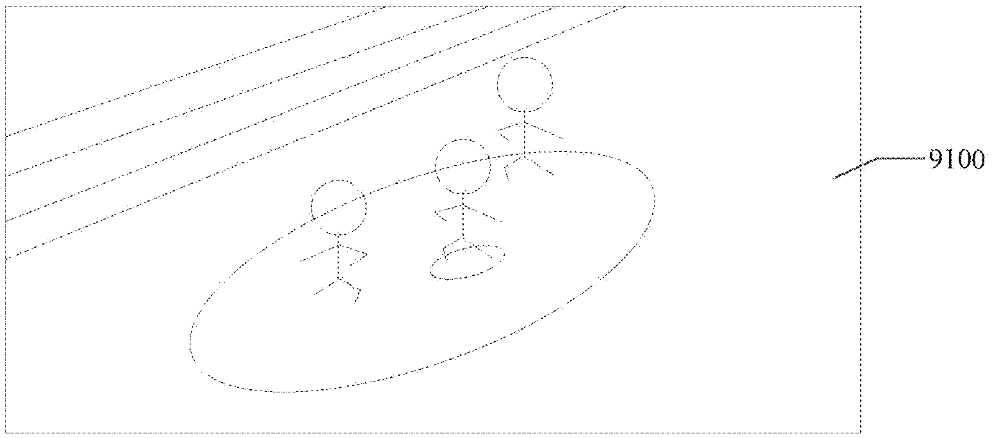
FIG. 9 schematically shows a schematic diagram of a live game interface of a viewer client according to an embodiment of the present disclosure.

FIG. 9 schematically shows a schematic diagram of a live game interface of a viewer client according to an embodiment of the present disclosure. As shown in FIG. 9, on a viewer client, a live game interface can be displayed after the immersive option is clicked by the viewer. The live game interface includes a game interface 9100.

In an exemplary embodiment of the present disclosure, the generating the live game interface according to the game interface and the control information to be presented includes: generating the live game interface by rendering the game interface according to the control information to be presented.

In step S140, the live game interface is transmitted to the viewer.

In an exemplary embodiment of the present disclosure, upon transmitting the live game interface to the viewer, an access authority for the live streaming room is assigned to the viewer. That is, when the viewer triggers an operation to access the live streaming room, the live streaming server or the cloud gaming server 202 transmits the live game interface to the viewer while assigning the access authority for the live streaming room to the viewer in response to the access operation for the live streaming room by the viewer.

In an exemplary embodiment of the present disclosure, the live game interface is transmitted to the viewer in a form of an encoded video stream.

Figure 10:
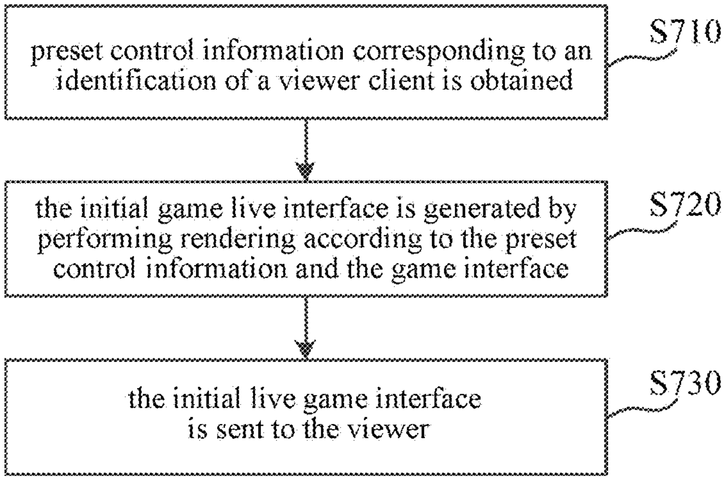
FIG. 10 schematically shows a schematic flowchart of determining an initial live game interface according to an embodiment of the present disclosure.

In an exemplary embodiment of the present disclosure, when the viewer accesses the live streaming room, the initial live game interface is sent to the viewer, so that the viewer may watch the live game interface without setting or selecting operations. FIG. 10 schematically shows a schematic flowchart of determining an initial live game interface. As shown in FIG. 10, in step S710, preset control information corresponding to an identification of a viewer client is obtained, and the preset control information is default interface information or control information selected by the viewer when logging in to the viewer client last time; in step S720, the initial game live screen is generated by performing rendering according to the preset control information and the game interface; and in step S730, the initial live game interface is sent to the viewer.

Figure 11:
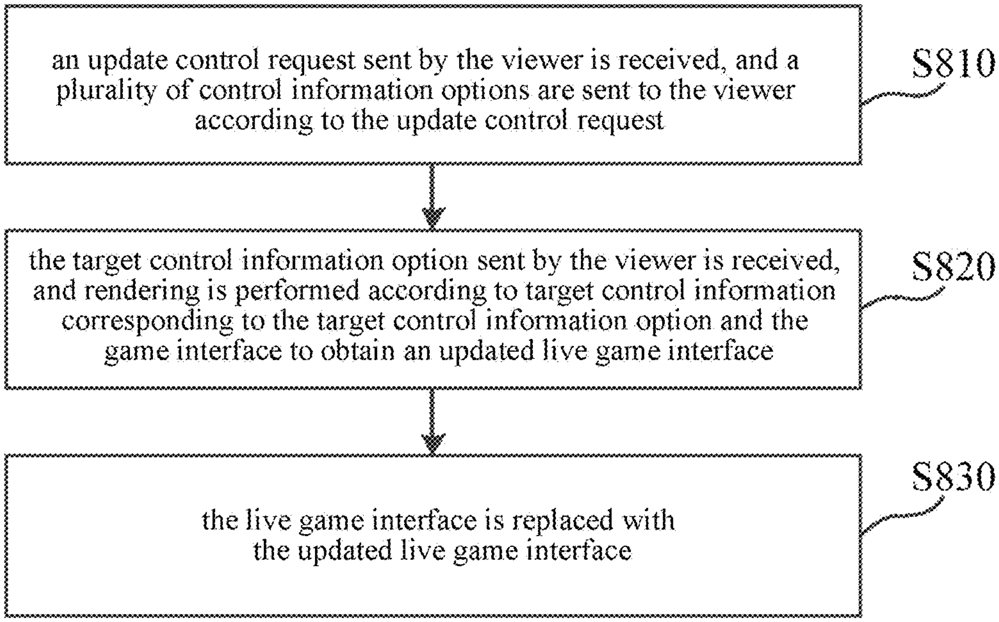
FIG. 11 schematically shows a schematic flowchart of updating a live game interface according to an embodiment of the present disclosure.

In an exemplary embodiment of the present disclosure, after the live game interface or the initial live game interface is transmitted to the viewer, the live game interface or the initial live game interface may be updated according to a trigger operation of the viewer. Specifically, FIG. 11 schematically shows a schematic flowchart of updating a live game interface. As shown in FIG. 11, in step S810, an update request sent by the viewer is received, and a plurality of options are sent to the viewer according to the update request; in step S820, the target option sent by the viewer is received, and rendering is performed according to target control information corresponding to the target option and the game interface to obtain an updated live game interface; and in step S830, the live game interface is replaced with the updated live game interface.

The following describes device embodiments of the present disclosure, which may be used to execute the above-mentioned method for controlling live game streaming of the present disclosure. For details that are not disclosed in the device embodiments of the present disclosure, please refer to the embodiments of the above method for controlling live game streaming of the present disclosure.

Figure 12:
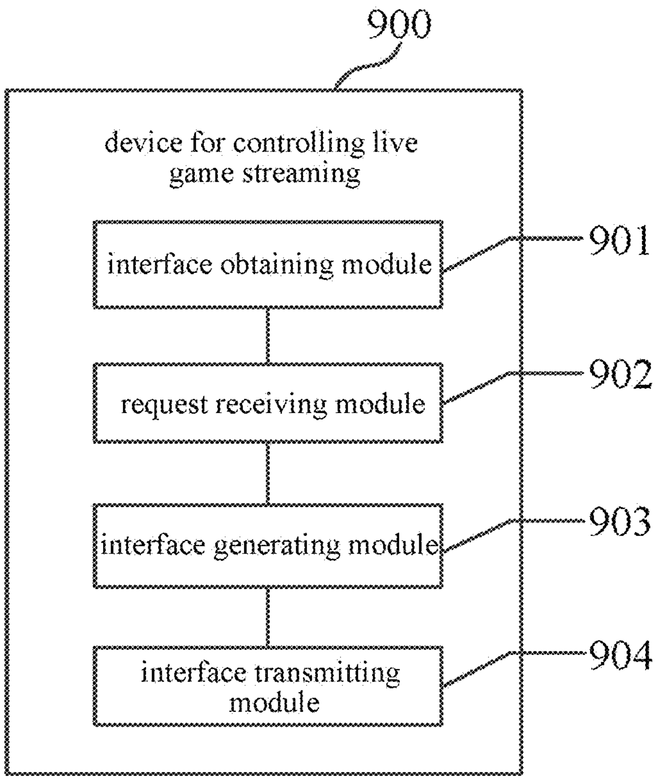
FIG. 12 schematically shows a block diagram of a device for controlling live game streaming according to an embodiment of the present disclosure.

FIG. 12 schematically shows a block diagram of a device for controlling live game streaming according to an embodiment of the present disclosure.

Referring to FIG. 12, a device for controlling live game streaming 900 according to an embodiment of the present disclosure is provided and includes: a screen obtaining module 901, a request receiving module 902, a screen generating module 903 and a screen transmitting module 904.

The screen obtaining module 901 is configured to obtain a game interface corresponding to a live streaming room.

The request receiving module 902 is configured to receive a presentation request sent by a viewer, and the presentation request is used for indicating the live streaming server or the cloud gaming server 202 to specify control information contained in a live game interface transmitted to the viewer.

The screen generating module 903 is configured to determine control information to be presented according to the presentation request, and generate the live game interface according to the game interface and the control information to be presented.

The screen transmitting module 904 is configured to transmit the live game interface to the viewer.

Specific details regarding the game live control device have been described in detail in the corresponding method for controlling live game streaming, and repeated descriptions are omitted here.

It should be noted that although several modules or units of the devices for execution are described above, such division is not mandatory. In fact, according to the embodiments of the present disclosure, the features and functions of two or more modules or units described above may be embodied in one module or unit. Conversely, the features and functions of a module or unit described above may be embodied in multiple modules or units.

An exemplary embodiment of the present disclosure also provides an electronic device capable of implementing the above methods.

Those skilled in the art can understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to as "circuit", "module', or "system".

An electronic device 1000 according to an exemplary embodiment of the present disclosure is described below with reference to FIG. 13. The electronic device 1000 shown in FIG. 13 is only an example, and should not impose any limitation on the functions and scope of use of the embodiments of the present disclosure.

Figure 13:
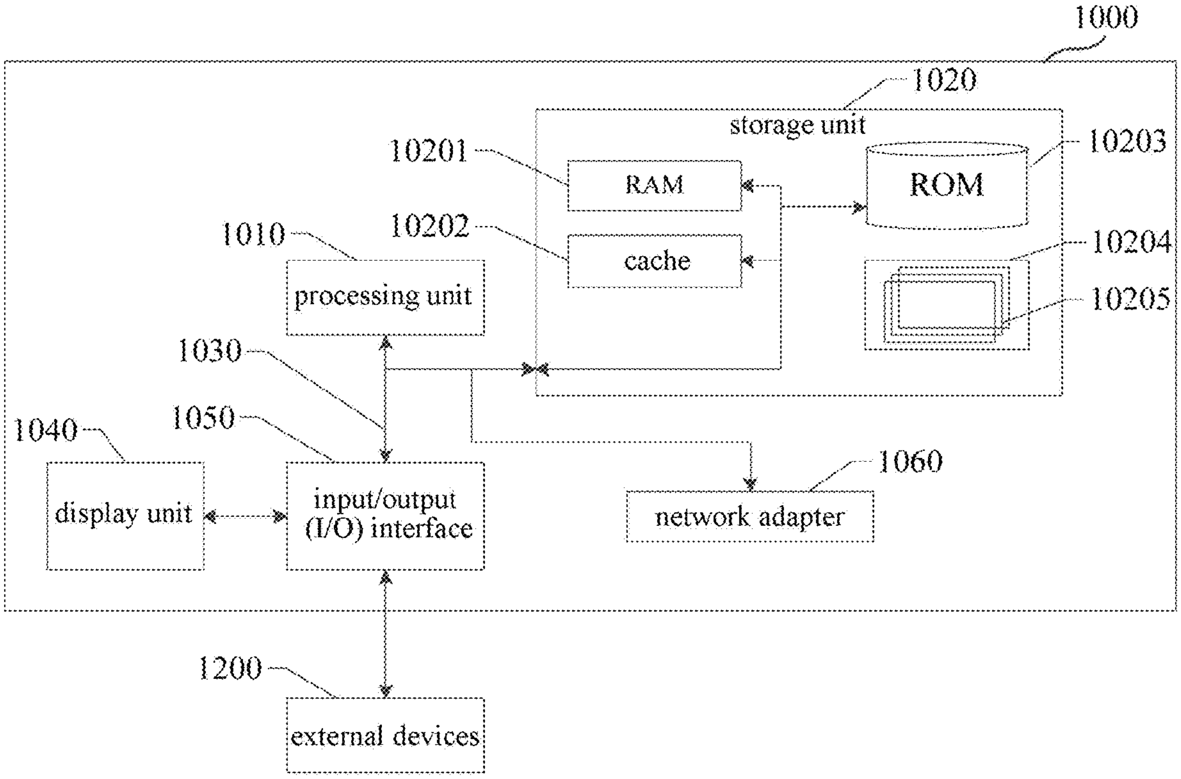
FIG. 13 schematically shows a schematic diagram of modules of an electronic device according to an embodiment of the present disclosure.

As shown in FIG. 13, the electronic device 1000 is shown in the form of a general-purpose computing device. The components of the electronic device 1000 may include, but are not limited to, at least one processing unit 1010, at least one storage unit 1020, a bus 1030 connecting different system components (including the storage unit 1020 and the processing unit 1010), and a display unit 1040.

The storage unit stores program codes, and the program codes may be executed by the processing unit 1010, so that the processing unit 1010 executes various exemplary embodiments according to the present disclosure described in the "exemplary methods" section of the present specification. For example, the processing unit 1010 may perform the steps shown in FIG. 1: in step S110, a game interface corresponding to a live streaming room is obtained; in step S120, a presentation request sent by a viewer is received, and the presentation request is used for indicating the live streaming server or the cloud gaming server 202 to specify control information contained in a live game interface transmitted to the viewer; in step S130, control information to be presented is determined according to the presentation request, and the live game interface is generated according to the game interface and the control information to be presented; and in step S140, the live game interface is transmitted to the viewer.

The storage unit 1020 may include a readable medium in the form of a volatile storage unit, such as a random access storage unit (RAM) 10201 and/or a cache storage unit 10202, and may further include a read-only storage unit (ROM) 10203.

The storage unit 1020 may further include a program/utility tool 10204 having a set (at least one) of program modules 10205. Such program modules 10205 include, but are not limited to, an operating system, one or more application programs, other program modules, and program data. Each or some combination of these examples may include an implementation of a network environment.

The bus 1030 may be one or more of several types of bus structures, including a memory unit bus or a memory unit controller, a peripheral bus, a graphics acceleration port, a processing unit, or a local area bus using any bus structure in a variety of bus structures.

The electronic device 1000 may also communicate with one or more external devices 1200 (such as a keyboard, a pointing device, a Bluetooth device, etc.), and may also communicate with one or more devices that enable a user to interact with the electronic device 1000, and/or may also communicate with any device (such as a router, a modem) that can enable the electronic device 1000 to interact with one or more other computing devices. Such communication may be performed through an input/output (I/O) interface 1050. Moreover, the electronic device 1000 may also communicate with one or more networks (such as a local area network (LAN), a wide area network (WAN), and/or a public network, such as the Internet) through the network adapter 1060. As shown in the figure, the network adapter 1060 communicates with other modules of the electronic device 1000 through the bus 1030. It should be understood that although not shown in the figure, other hardware and/or software modules may be used in conjunction with the electronic device 1000, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product runs on a terminal device, the program codes are used to cause the terminal device to execute the steps according to various exemplary embodiments of the present disclosure described in the "exemplary methods" section of the present specification.

Figure 14:
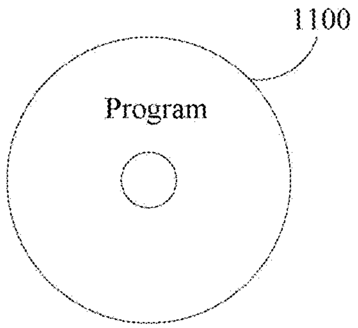
FIG. 14 schematically shows a schematic diagram of a program product according to an embodiment of the present disclosure.

FIG. 14 shows a program product 1100 for implementing the above methods according to an exemplary embodiment of the present disclosure. The program product 1100 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may be any combination of one or more readable mediums. The readable medium may be a readable signal medium or a readable storage medium. The readable storage medium may be, for example, but is not limited to, electronic, magnetic, optical, electromagnetic, infrared, or a semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It should be understood that the present disclosure is not limited to the precise structure that has been described above and shown in the drawings, and various modifications and changes may be made without departing from the scope of the present disclosure. The scope of the disclosure is only defined by the appended claims.

What is claimed is:

1. A method for controlling live game streaming, implemented at a streaming server, comprising:

obtaining, by the streaming server, a game interface corresponding to a live streaming room, wherein the game interface is generated from a game played at a streamer client and the game interface is displayed in the live streaming room;

receiving, by the streaming server, a presentation request sent by a viewer client, wherein the viewer client is a client of a viewer that watches a live stream of the game played at the streamer client, and the presentation request is configured to request to specify, by the viewer, a control widget included in a live game interface that is to be transmitted from the server to the viewer client;

sending, by the streaming server, a plurality of options to the viewer client in response to the presentation request, wherein each of the plurality of options corresponds to a different setting of the control widget in the live game interface, and the plurality of options comprise an option for the viewer to select whether to include in the live game interface a game operation control displayed on a game interface of the streamer client;

determining, by the streaming server, a first target option selected by the viewer client from the plurality of options;

determining, by the streaming server, the control widget to be presented according to the first target option, and generating, by the streaming server, the live game interface including the game interface and the control widget to be presented; and transmitting, by the streaming server, the live game interface to the viewer client in a form of an encoded video stream.

2. The method according to claim 1, wherein the obtaining the game interface corresponding to the live streaming room comprises:

receiving an access request for the live streaming room sent by the viewer client, wherein the access request comprises live streaming room information; and obtaining the game interface according to the live streaming room information.

3. The method according to claim 1, wherein the generating the live game interface including the game interface and the control widget to be presented comprises:

generating the live game interface by rendering the game interface according to the control widget to be presented.

4. The method according to claim 1, wherein upon transmitting the live game interface to the viewer client, the method further comprises:

assigning an access authority for the live streaming room to the viewer client.

5. The method according to claim 1, further comprising:

determining an initial live game interface according to an identification of the viewer client and the game interface, and transmitting the initial live game interface to the viewer client.

6. The method according to claim 5, wherein the determining the initial live game interface according to the identification of the viewer client and the game interface comprises:

obtaining a preset control widget corresponding to the identification of the viewer client; and generating the initial live game interface by performing rendering according to the preset control widget and the game interface.

7. The method according to claim 6, wherein the preset control widget is determined based on default interface information or selected by the viewer client during previous access.

8. The method according to claim 1, wherein after transmitting the live game interface to the viewer client, the method further comprises:

receiving, by the streaming server, an update request sent by the viewer client;

sending, by the streaming server, the plurality of options to the viewer client according to the update request;

receiving, by the streaming server, a second target option selected by the viewer client from the plurality of options;

generating, by the streaming server, an updated live game interface including the game interface and a target control widget corresponding to the second target option; and transmitting, by the streaming server to the viewer client, the updated live game interface in replacement of the live game interface.

9. The method according to claim 1, wherein before obtaining the game interface corresponding to the live streaming room, the method further comprises:

receiving a creation request for the live streaming room sent by the streamer client, calling a preset interface and creating the live streaming room according to the creation request;

obtaining a game instruction sent by the streamer client in real time, and obtaining the live game interface according to the game instruction; and obtaining a streamer live game interface by performing rendering according to streamer initial interface information and the live game interface, and transmitting the streamer live game interface to the streamer.

10. The method according to claim 1, wherein the obtaining the game interface corresponding to the live streaming room comprises:

determining the streamer client corresponding to the live streaming room according to the live streaming room; and obtaining a game interface in the streamer client, and using a live game interface on the streamer client as the game interface corresponding to the live streaming room.

11. A non-volatile computer-readable storage medium having a computer program stored thereon, wherein the computer program, when being executed by a processor of a streaming server, cause the streaming server to perform operations for controlling live game streaming, the operations comprising:

obtaining a game interface corresponding to a live streaming room, wherein the game interface is generated from a game played at a streamer client and the game interface is displayed in the live streaming room;

receiving a presentation request sent by a viewer client, wherein the viewer client is a client of a viewer that watches a live stream of the game played at the streamer client, and the presentation request is configured to request to specify, by the viewer, a control widget included in a live game interface that is to be transmitted from the server to the viewer client;

sending a plurality of options to the viewer client in response to the presentation request, wherein each of the plurality of options corresponds to a different setting of the control widget in the live game interface, and the plurality of options comprise an option for the viewer to select whether to include in the live game interface a game operation control displayed on a game interface of the streamer client;

determining a first target option selected by the viewer client from the plurality of options;

determining the control widget to be presented according to the first target option, and generating the live game interface including the game interface and the control information to be presented; and transmitting the live game interface to the viewer client in a form of an encoded video stream.

12. An electronic device comprising:

one or more processors; and a storage device for storing one or more programs, which, when being executed by the one or more processors, cause the one or more processors to implement operations for controlling live game streaming, wherein the operations comprise:

obtaining a game interface corresponding to a live streaming room, wherein the game interface is generated from a game played at a streamer client and the game interface is displayed in the live streaming room;

receiving a presentation request sent by a viewer client, wherein the viewer client is a client of a viewer that watches a live stream of the game played at the streamer client, and the presentation request is configured to request to specify, by the viewer, a control widget included in a live game interface that is to be transmitted from the server to the viewer client;

sending a plurality of options to the viewer client in response to the presentation request, wherein each of the plurality of options corresponds to a different setting of the control widget in the live game interface, and the plurality of options comprise an option for the viewer to select whether to include in the live game interface a game operation control displayed on a game interface of the streamer client;

determining a first target option selected by the viewer client from the plurality of options;

determining the control widget to be presented according to the first target option, and generating the live game interface including the game interface and the control information to be presented; and transmitting the live game interface to the viewer client in a form of an encoded video stream.

13. The electronic device according to claim 12, wherein the obtaining the game interface corresponding to the live streaming room comprises:

receiving an access request for the live streaming room sent by the viewer client, wherein the access request comprises live streaming room information; and obtaining the game interface according to the live streaming room information.

14. The electronic device according to claim 12, wherein the generating the live game interface including the game interface and the control widget to be presented comprises:

generating the live game interface by rendering the game interface according to the control widget to be presented.

15. The electronic device according to claim 12, wherein upon transmitting the live game interface to the viewer client, the operations further comprise:

assigning an access authority for the live streaming room to the viewer client.

16. The electronic device according to claim 12, wherein the operations further comprise:

determining an initial live game interface according to an identification of the viewer client and the game interface, and transmitting the initial live game interface to the viewer client.

17. The electronic device according to claim 16, wherein the determining the initial live game interface according to the identification of the viewer client and the game interface comprises:

obtaining a preset control widget corresponding to the identification of the viewer client; and generating the initial live game interface by performing rendering according to the preset control widget and the game interface.

18. The electronic device according to claim 17, wherein the preset control widget is determined based on default interface information or selected by the viewer client during previous access.

19. The electronic device according to claim 12, wherein after transmitting the live game interface to the viewer client, the operations further comprise:

receiving an update request sent by the viewer client;

sending the plurality of options to the viewer client according to the update request;

receiving a second target option selected by the viewer client from the plurality of options;

generating an updated live game interface including the game interface and a target control widget corresponding to the second target option; and transmitting, to the viewer client, the updated live game interface in replacement of the live game interface.

20. The electronic device according to claim 12, wherein before obtaining the game interface corresponding to the live streaming room, the operations further comprise:

receiving a creation request for the live streaming room sent by the streamer client, calling a preset interface and creating the live streaming room according to the creation request;

obtaining a game instruction sent by the streamer client in real time, and obtaining the live game interface according to the game instruction; and obtaining a streamer live game interface by performing rendering according to streamer initial interface information and the live game interface, and transmitting the streamer live game interface to the streamer.

* * * * *